Figure 1:
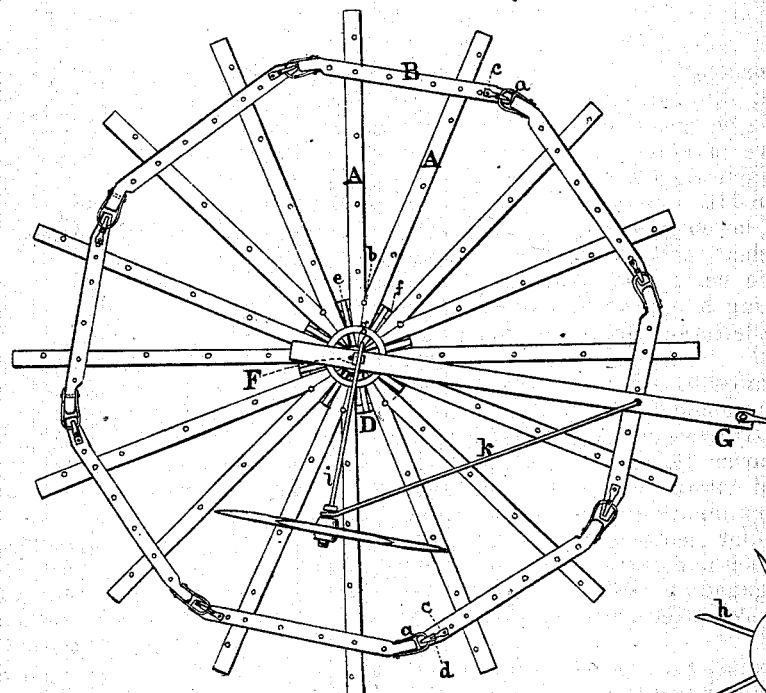
Figure 3:
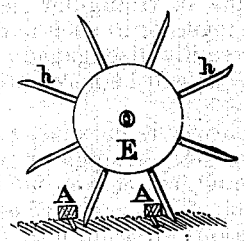
Figure 2:
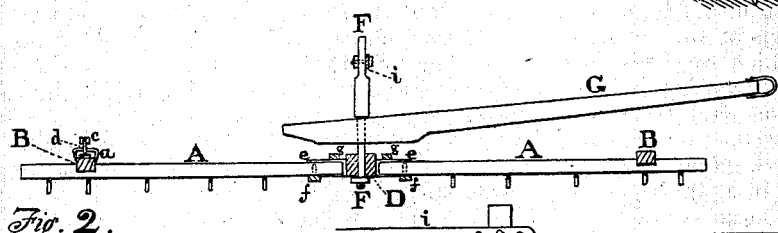
Figure 6:
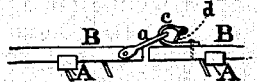
Figure 4:
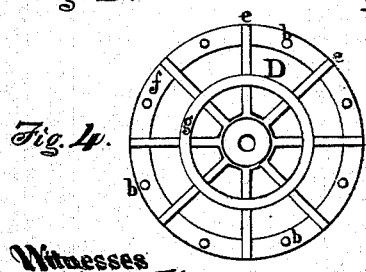
Figure 5:
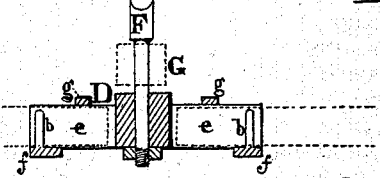

R. RAKESTRAW.
Rotary-Harrows.

No. 139,814. Patented June 10, 1873.

Witnesses
Jas. Thurston
Charles Stanhope

Roland Rakestraw
by Edwd Thurston
his atty in fact

UNITED STATES PATENT OFFICE.

ROLAND RAKESTRAW, OF WYOMING, ILLINOIS.

IMPROVEMENT IN ROTARY HARROWS.

Specification forming part of Letters Patent No. 139,814, dated June 10, 1873; application filed April 1, 1873.

*To all whom it may concern:*

Be it known that I, ROLAND RAKESTRAW, of Wyoming, in the county of Stark, in the State of Illinois, have invented an Improvement on my Rotary Harrow, patented to me by the United States on 11th day of July, 1871, No. 116,191; and do hereby declare that the following is a full, clear, and exact description thereof, reference being had to the annexed drawings making a part of this specification, in which like letters of reference refer to like parts.

This invention relates to a rotary harrow having the hub or box made with radial arms or plates, and concentric rims or flanges above and below the said arms, the concentric rim below being provided with a vertical pin between each arm, in combination with the harrow made in triangular sections hinged or hooked together in such a manner that they can be readily disengaged and removed from the hub, as will be hereinafter more fully explained.

The harrow is circular, composed of eight (more or less) triangular sections, centered and jointed in a central boxing upon pins rising from the lower surface of said boxing. The sections are each hitched to the contiguous section by a clevis or similar device, so as to form a circle which revolves around the center or king bolt, which is centered in the boxing. The sections are studded with teeth on their lower surfaces. A tongue or draft-bar is pivoted upon the king-bolt, and a stepping-wheel having radial sharp spokes is set vertically at a right angle to the tongue upon the end of a bar also pivoted upon the king-bolt. In the forward progress of the harrow this wheel prevents the rotation of the harrow in any other direction than that of a motion in an opposite direction to its own progress—that of the stepping-wheel.

A A in the drawings represent the diverging arms of one of the harrow-sections, which are fastened together near their extremities by a brace, B, each being provided with any known form of teeth. The converging points of each section are united in a secure manner, and are retained in one of the recesses in the central boxing upon a pin, b, which passes into a hole vertically in the end of the section, or vice versa. The outer ends of the contiguous harrow-sections are hitched together by a clevis, a c, and secured from dislocation by a drop-catch, d, pendent from the point of the hook c; or the hitch may be formed of a hook-and-eyed staple or similar jointing of one section to its like, in order to permit as much independent motion of each section as possible, to accommodate its teeth to uneven ground. D represents the central boxing, so constructed with radial vertical arms e, cast with a lower horizontal concentric rim or flange, f, uniting their extremities and forming triangular recesses between said arms to receive the points of the harrow-sections and an upper concentric ring, g, of a less diameter. A pin in each recess rises from the lower ring f to retain the section between the rings. E, a vertical stepping-wheel, the particular form being immaterial, and like that described in my former patent. It is composed of several radial sharpened arms, h, of such a length and distance between the several points as to step in rotating between the contiguous arms of the harrow. It is set upon the end of an arm, i, which extends from the king-bolt or its vicinity horizontally at a right angle from the tongue G, in which position it is retained, the arm i, by a brace-rod, k, extending to the tongue. Several holes in that end of the arm i next to the king-bolt are the means of adjusting the step of the wheel to the interspaces of the harrow. A bolt and nut secure it to the king-bolt. F, a central pin or king-bolt upon which the harrow revolves, and which also passes through the heel of the tongue G.

The operation of this harrow is as follows: The draft of the same is central, and in passing over the field the sharpened points of the stepping-wheel E enter the soil between every radial arm A and cause the whole harrow to rotate; at the same time the loose attachment of the sections to one another and to the boxing allows all parts of the harrow bearing teeth to be in continual contact with and fully stir the soil.

What I claim as my invention is—

The box or hub D made with radial arms $e$ and concentric rims or flanges $f$ $g$, concentric rim $f$ being provided with vertical pins $b$, in combination with the harrow made in triangular sections A, hinged or hooked together, substantially as and for the purpose set forth.

In testimony that I claim the foregoing improvement in rotary harrows I have hereunto set my hand this 19th day of March, A. D. 1873.

ROLAND RAKESTRAW.

Witnesses:
B. F. ROCKHOLD,
JOHN F. ROCKHOLD.